United States Patent
Prakash

(10) Patent No.: US 11,205,459 B2
(45) Date of Patent: Dec. 21, 2021

(54) USER GENERATED CONTENT WITH ESRB RATINGS FOR AUTO EDITING PLAYBACK BASED ON A PLAYER'S AGE, COUNTRY, LEGAL REQUIREMENTS

(71) Applicant: Sony Interactive Entertainment LLC, San Mateo, CA (US)

(72) Inventor: Ramana Prakash, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/678,219

(22) Filed: Nov. 8, 2019

(65) Prior Publication Data

US 2021/0142828 A1    May 13, 2021

(51) Int. Cl.
*G11B 27/036* (2006.01)
*G11B 27/034* (2006.01)
*A63F 13/85* (2014.01)
*A63F 13/60* (2014.01)

(52) U.S. Cl.
CPC ............ *G11B 27/036* (2013.01); *A63F 13/60* (2014.09); *A63F 13/85* (2014.09); *G11B 27/034* (2013.01)

(58) Field of Classification Search
CPC ..... G11B 27/036; G11B 27/034; A63F 13/60; A63F 13/85
See application file for complete search history.

(56) References Cited

U.S. PATENT DOCUMENTS

| | | | |
|---|---|---|---|
| 9,999,836 B2* | 6/2018 | Lampe | A63F 13/86 |
| 2012/0058812 A1* | 3/2012 | Walker | G06Q 10/063 463/22 |
| 2014/0157151 A1* | 6/2014 | Westmoreland | G06Q 50/01 715/753 |
| 2018/0048831 A1* | 2/2018 | Berwick | G11B 27/038 |
| 2019/0066279 A1* | 2/2019 | Monkarsh | H04L 67/306 |
| 2020/0077144 A1* | 3/2020 | Zavesky | H04N 21/4431 |

OTHER PUBLICATIONS

International Search Report and Written Opinion dated Dec. 22, 2020, from the counterpart PCT application PCT/US2020/059653.

* cited by examiner

*Primary Examiner* — Thai Q Tran
*Assistant Examiner* — Jose M Mesa
(74) *Attorney, Agent, or Firm* — John L Rogitz

(57) ABSTRACT

User-generated content (UGC) is associated with metadata indicating type of content. A spectator device can access the UGC using a unique identifier and correlate the metadata with ratings filters in a spectator's profile. The spectator device and/or a network server can edit portions of the UGC according to the ratings filters and metadata and/or replace portions of the UGC according to the ratings filters and metadata.

20 Claims, 14 Drawing Sheets

USER GENERATED CONTENT WITH ESRB RATINGS FOR AUTO EDITING PLAYBACK BASED ON A PLAYER'S AGE, COUNTRY, LEGAL REQUIREMENTS

FIELD

The application relates generally to technically inventive, non-routine solutions that are necessarily rooted in computer technology and that produce concrete technical improvements.

BACKGROUND

As understood herein, a player of a computer simulation such as a computer game may wish to generate a video of the player's game play, so that the video may be shared with others who might want to watch the game unfold as played by the player.

SUMMARY

As also understood herein, some computer simulations may contain subject matter that the player would find acceptable but that subsequent viewers, e.g., children, might not. Nonetheless, a video of play of a computer game containing objectionable subject matter might be provided to one or more viewers for whom portions of the computer game might not be appropriate.

In overview, when a user creates a video for sharing on a game console (e.g., Play Station) network or other sharing services, the game is sets UDS (Universal Data System) events associated with the video. These events or metadata correspond to certain important actions or events happening in the game. The game can also set event types for the various entertainment software ratings board (ESRB) ratings (events provided by the simulation system such as language, sexual content, gore etc.) and those points in the video are marked, e.g., indicating that for a particular segment there is sexual content in this video. The age, country, viewing preferences, etc. of a viewer as indicated by, e.g., the viewer's game system profile, can be accessed and the metadata tags contained within the video (or stored separately on the server) accessed and compared to the profile to automatically edit the video on the fly as it plays back on that player's device. For each player who views the video a different video can be created on the fly (if desired also pre-calculating the total time of the video as well based on what was edited out so players know how long the video will be before playing it). So, for example sexual content in a segment of the video can be removed on the fly by the video player. This editing protects the viewer from unwanted content. Other content type filters can be used for other viewers/players depending on the filters in their profiles.

Accordingly, a system includes at least one source computing device configured with executable instructions to generate, from at least one computer game, user-generated content (UGC) associated with metadata comprising at least one content type indicator. The system also includes at least one spectator computing device configured with executable instructions to access the UGC using a unique identifier (ID) associated therewith. The spectator computing device is associated with at least one content filter. The system further includes at least one editing device, which may be established by a network server or by the spectator computing device, that is configured with executable instructions to modify the UGC for presentation on the spectator computing device according to the metadata and the content filter.

In some examples, the unique ID includes a pseudo-random number. In other examples the unique ID includes a combination of a device ID, and at least one time.

If desired, the editing device can be configured with executable instructions to conceal at least a portion of the UGC according to the metadata and the content filter. The editing device can be configured with executable instructions to replace at least a portion of the UGC with data from a computer network according to the metadata and the content filter. The editing device can be configured with executable instructions to mute audio associated with the UGC according to the metadata and the content filter. Also, the editing device can be configured with executable instructions to replace audio associated with the UGC according to the metadata and the content filter.

In example embodiments, the metadata is stored on at least one server separately from the UGC. In other examples the metadata embedded in the UGC. The metadata may indicate a specific content type, or it may indicate a generic rating.

In another aspect, a system includes a developer computer receiving input of content tags signifying type of content at various points in a video. A first segment of the video is associated with a first tag indicating "general viewing", and a second segment of the video is associated with a second tag indicating at least one of: "sexual content", "violence", political content. The system also includes a viewer device requesting the video and associated with a video generator to generate a version of the video altered as appropriate according to one or more content filters associated with the viewer device and the content tags.

In another aspect, an apparatus includes at least one computer storage that is not a transitory signal and that in turn includes instructions executable by at least one processor to establish user generated content (UGC) and associate the UGC with a unique identifier (ID). The instructions also are executable to associate a first segment of the UGC with first metadata indicating a first type of content in the first segment and associate a second segment of the UGC with second metadata indicating a second type of content in the second segment. The instructions are executable to upload the UGC with metadata to a network server for provisioning the UGC to at least one spectator computer.

The details of the present application, both as to its structure and operation, can best be understood in reference to the accompanying drawings, in which like reference numerals refer to like parts, and in which:

DETAILED DESCRIPTION

Figure 1:
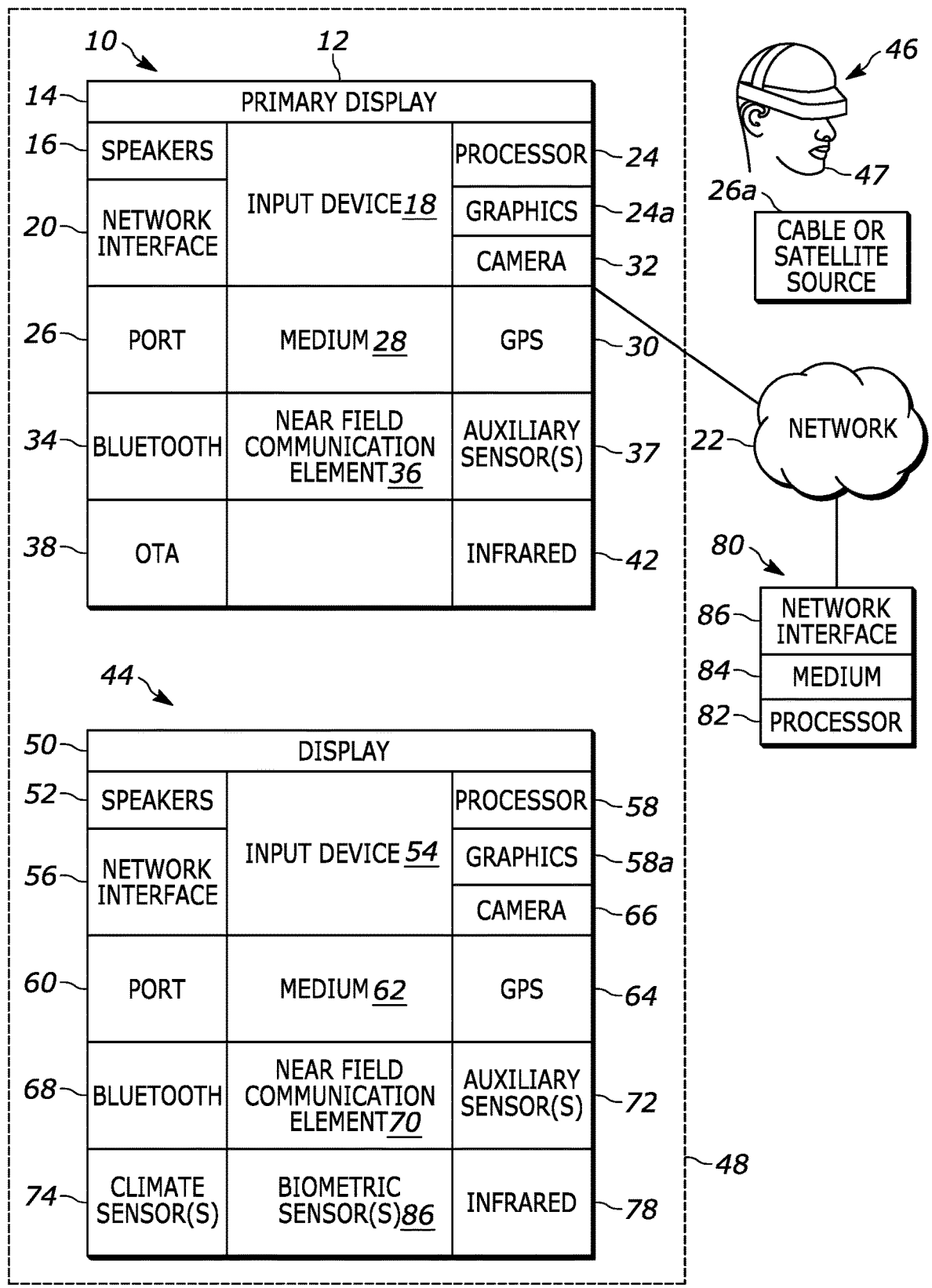
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple or Google. These operating environments may be used to execute one or more browsing programs, such as a browser made by Microsoft or Google or Mozilla or other browser program that can access web sites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be, e.g., a separate or integrated set top box, or a satellite receiver. Or, the source 26*a* may be a game console or disk player containing content that might be regarded by a user as a favorite for channel assignment purposes described further below. The source 26*a* when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
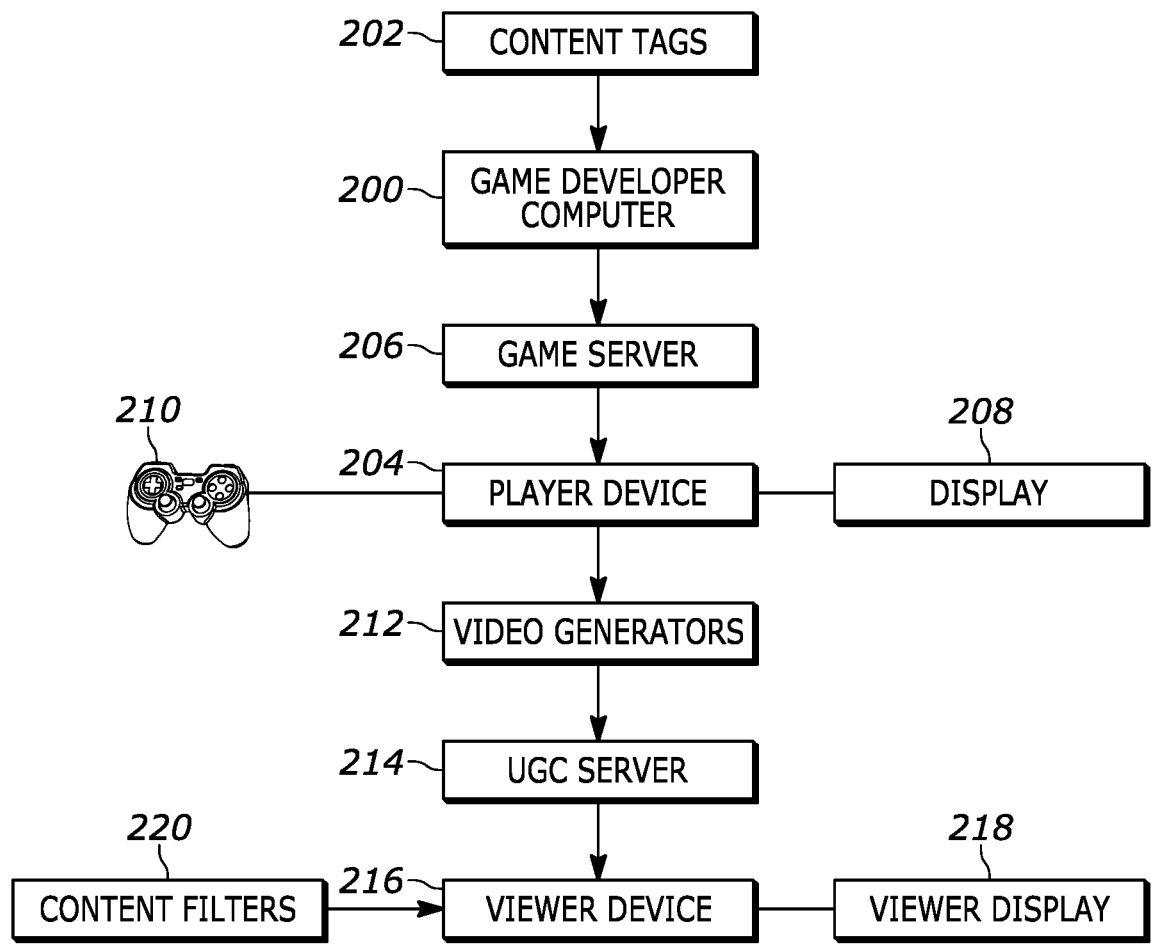
FIG. 2 is a block diagram of an example system illustrating provisioning of a video of gameplay to one or more viewers.

Now referring to FIG. 2, a system is shown with plural computers that may be implemented by any one or more of the devices in FIG. 1 with accompanying components as described, as appropriate. A game developer computer 200 may receive input of content tags 202 signifying the type of content being presented at various points in the video simulation (such as a computer game) being authored or developed. For example, a first segment of a game might be associated by the developer of the game with a first tag indicating "general viewing" while a second segment might be associated with a tag indicating "sexual content". Yet a third segment of the game might be associated with a tag indicating "violence" while a fourth segment might be associated with a political content tag, such as "offensive in China". Other content types are contemplated, such as "depicts drug use".

The game with tags is provided to a game player device 204, such as a computer game console, typically through one or more game servers 206 via the Internet, although other means of distribution may be used. The player device 204 may present the game on an audio-video display 208 such as a TV, typically under control of input signals from one or more game controllers 210.

As shown in FIG. 2, the player device 204 can be associated with a video generator 212 such as a broadcast or streaming application to generate a video of the game as played by the player device 204 and to send the video to one or more user generated content (UGC) servers 214. One or more viewer devices 216 can access the UGC server 216 to access the video and present the video on a viewer display 218, altered as appropriate according to one or more content filters 220 associated with the viewer device 216 and/or a viewer thereof in accordance with disclosure below.

It is to be understood that while the description of segments can imply a linear format to a game, this may not be the case for all types of games. Some games are open world and therefore there is no linear story and therefore segmentation or scenes is harder to describe for the game play itself. Segments can make sense for cut scenes in a game or games that follow a set path (e.g., a side scroller, or game on-rails).

Stated differently, authoring and publishing process for content in the game may be thought of as the alternation of content using different data (video, audio, etc.), then script writers author text that is displayed or spoken. If there are multiple versions that a game wanted to support, then the writers can create multiple assets for each one. As an example, if a line in a game contains a profane term suitable for a "teen/mature" normal version of the text), a substitute line could contain all the same words except a replacement of the profane term to render it suitable for an "everyone" version of the text.

When the text or audio is then captured or produced on the game developer's computing device (200), the developer creates text strings in a file or audio files for the various levels of content the developer wishes to support. This creation process may involve tagging the content locally stored on the game disk (or package file) on the medium 204 or uploading these tags and audio to the game server 206.

When the remote users video player attempts to playback the mature version, the alternate data associated with the profane line (cleaned up to eliminate profanity) can be played back instead. The alternative data may be provided by the server 206. Also, if the remote viewer has the game locally installed, then a video player can load that data and play that data from the installation of the game itself.

Note that a video player can be either the computing device itself (for instance, a simulation console such as a PlayStation), or the game can also render the video as well and use this data to render alternate versions of the content.

Figure 3:
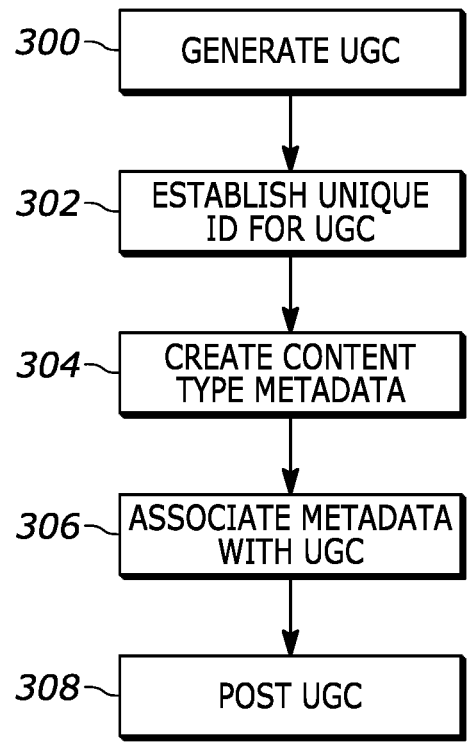
FIG. 3 is a flow chart of example game developer computer logic consistent with present principles.

In general, prior to describing FIG. 3 in detail, the high levels steps of production may be considered to be creation and tagging the content on the developer computer 200 for each content level being supported, followed by storing the content and any associated tag on the game disk or package and/or uploading to the server 206.

As the game is played, various assets and/or files are loaded by the game and the game knows from the content and the metadata tags how to treat a particular scene in terms of content ratings. For example, if a weapon is loaded which is known to cause huge damage/violence the game can tag the entire time the weapon is used as being Strong Violence and present substitute content according to the content filters in the player's profile. Similarly, the game can also analyze the damage and destruction generated by the results of that weapon as well to determine an appropriate content rating. Other methods such as the system or game itself analyzing a particular scene can be used to determine an appropriate rating if the loaded data and metadata tags from those files cannot be used to come up with a corresponding rating. For example, the game can analyze if it needs to render blood, damaged limbs, etc. and then determine the appropriate metadata tags for the appropriate time and duration.

FIG. 3 illustrates logic for the creation of UGC, it being understood that the order of steps in FIG. 3 is by way of example and that certain steps may be performed other than in the order shown. Commencing at block 300, a piece of UGC is created by a user-creator. Moving to block 302, the UGC is associated with a unique identifier (ID). In some embodiments a unique alpha-numeric or coded (bar code, quick response code, etc.) ID is established for each piece of UGC that is created. In other embodiments the unique ID is established as a combination (such as a concatenation) of a universal timestamp indicating time of creation, a user's (such as the creator's) account ID, and/or a device ID of a device used to create the UGC.

Proceeding from block 302 to block 304, metadata is created that indicates a type of content for at least some segments of the UGC. For example, a first minute-long segment of the UGC may be considered by a content rater to be appropriate for all viewers, and the metadata associated with the first segment would so indicate (e.g., "all viewers"). A second segment of the UGC may contain violence, and the metadata associated with that second segment can so indicate, while a third segment may include sex scenes, with the associated metadata so indicating. Yet a fourth segment may include subject matter that is critical of a particular country or religion that happens to be insecure, and the associated metadata would indicate that the content is "critical of [name of country]". The metadata is associated with the UGC at block 306 according to further description herein and then made available at block 308 by, e.g., uploading the UGC to a network server.

Figure 4:
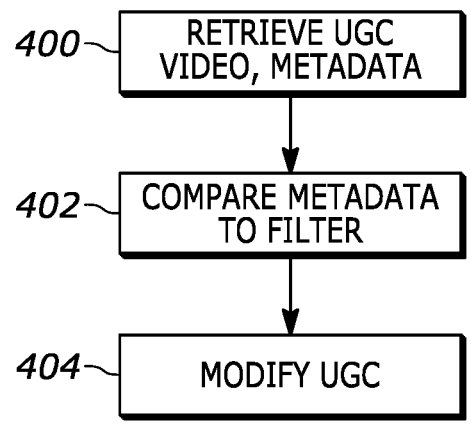
FIG. 4 is a flow chart of example game player logic consistent with present principles.

FIG. 4 illustrates logic on the UGC viewer side. Commencing at block 400, the UGC video data and metadata is retrieved from, e.g., a network service, or the UGC video data with metadata embedded in it is retrieved as discussed further below. Moving to block 402, the metadata is compared with filters in the viewer's profiles. Proceeding to block 404, based on the comparison at block 402 a modified video of the UGC video is created per player or group. The modified video data can be streamed from another backend service or the video data can be modified on the player's remote computing device such as a computer game console.

Figure 5:
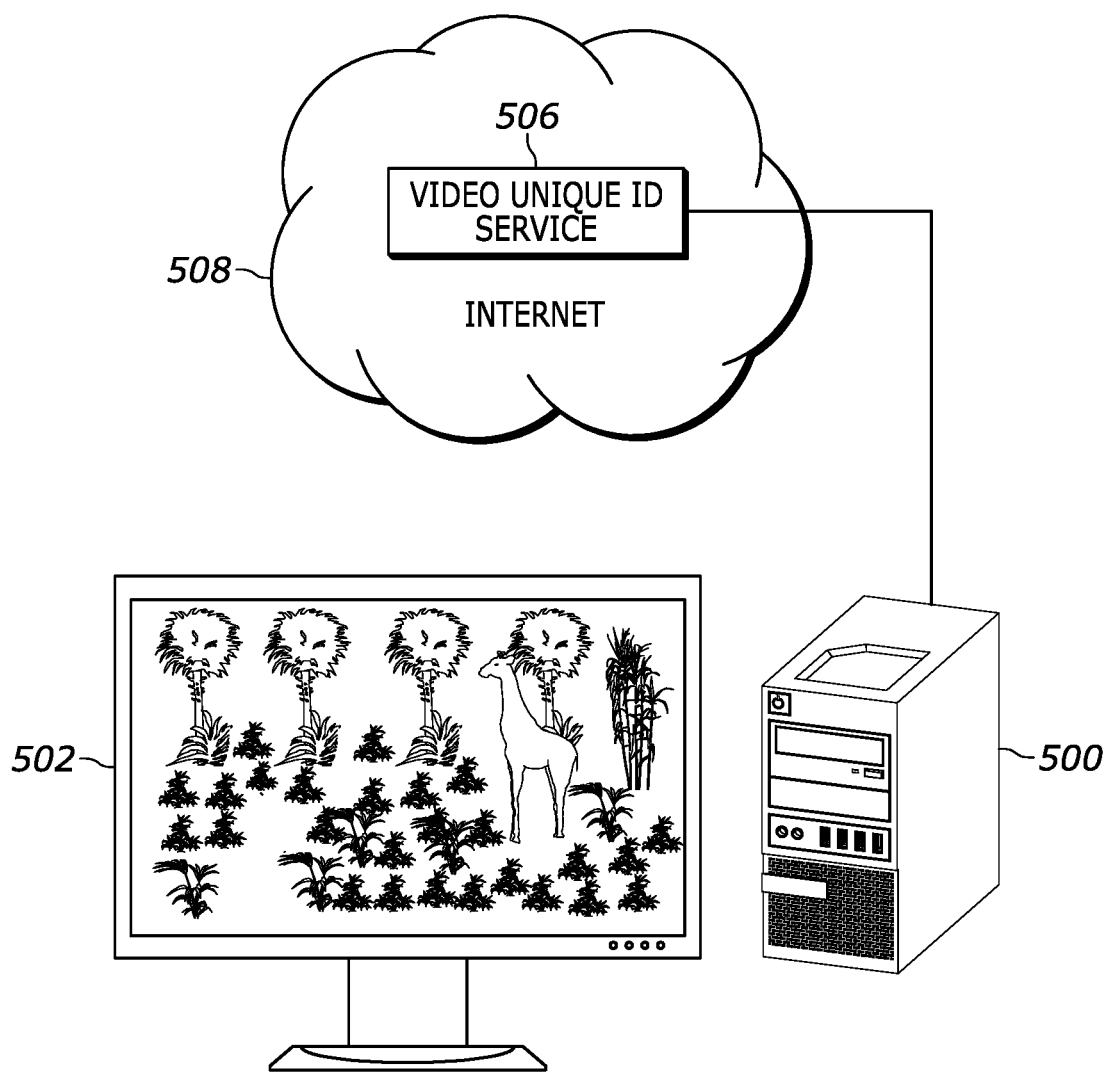
FIG. 5 is a schematic diagram illustrating video-unique ID techniques.
Figure 6:
FIG. 6 is a schematic diagram of a video stream.

Turning to FIGS. 5 and 6, a computing device 500 with display 502 (FIG. 5) such as any of the computing devices described herein can be used by an author to generate user generated content (UGC) in the form of a video 504 (FIG. 6) such as a video of the play of a computer game on the computing device 500. The UGC 504 is uniquely identified with a unique ID from, e.g., an ID service 506 executed by a server and communicated to the computing device 500 via the Internet 508. Or, the computing device 500 may generate the unique ID locally.

Thus, the unique ID can be generated at any time either locally by the content creator's computing device 500 or by asking a network service 506 to generate the unique ID. The unique ID may be generated pseudo-randomly.

Or, a combination of known data may be used to generate the unique ID. For example, a combination such as a concatenation of the player's account Id with the device Id of the computing device 500 with a further concatenation with a timestamp or game title may be used. The unique ID is then associated with the UGC 504 by, for example, appending the unique ID to one or more portions of the UGC 504, correlating the unique ID with the UGC 504 in a database, etc.

An example of a unique video ID created as a result of video capture and/or live streaming using a combination of known data is:

```
{
  "id": "videof8a67551dbe4d8ca96562b47bc36343",
  "gameTitleId" : "ABCD00000_00",
  "accountId" : "39848392847593123",
  "StartTime" : "1571337592714",
  "endTime" : "1571337892714",
  "totalTime": "05:00",
  "URI": "https://video.service.com/cdn/video?id="
}
```

Live Stream example, where there is no recorded end-Time:

```
{
    "id": "videof8a67551dbe4d8ca96562b47bc36343",
    "gameTitleId" : "EFGHD00000_00",
    "accountId" : "39848392847593123",
    "StartTime" : "1571337592714",
    "endTime" : "-",
    "totalTime": "-",
    "URI": "https://live-video.service.com/cdn/video?id="
}
```

Figure 7:
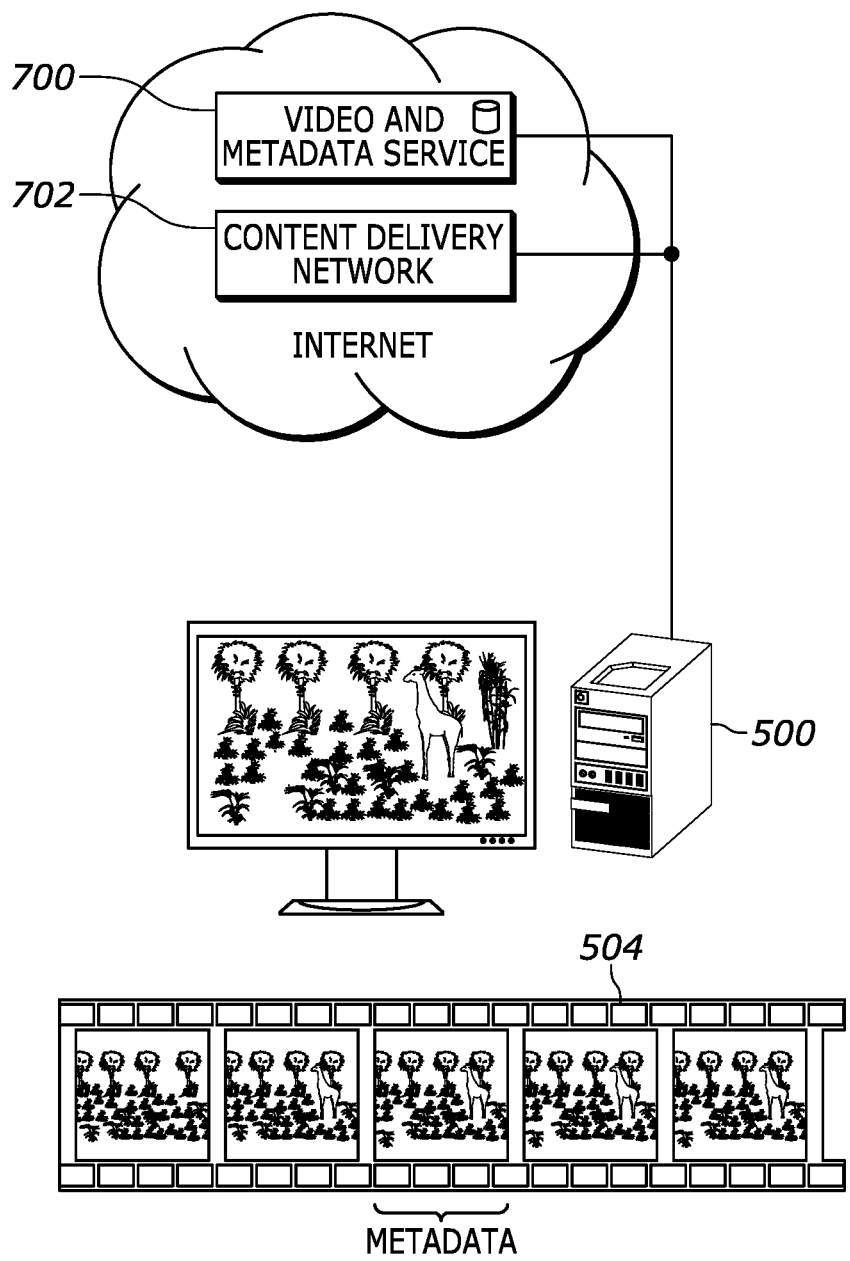
FIGS. 7-9 are schematic diagrams illustrating techniques for binding metadata to video using a separate network entity.
Figure 8:
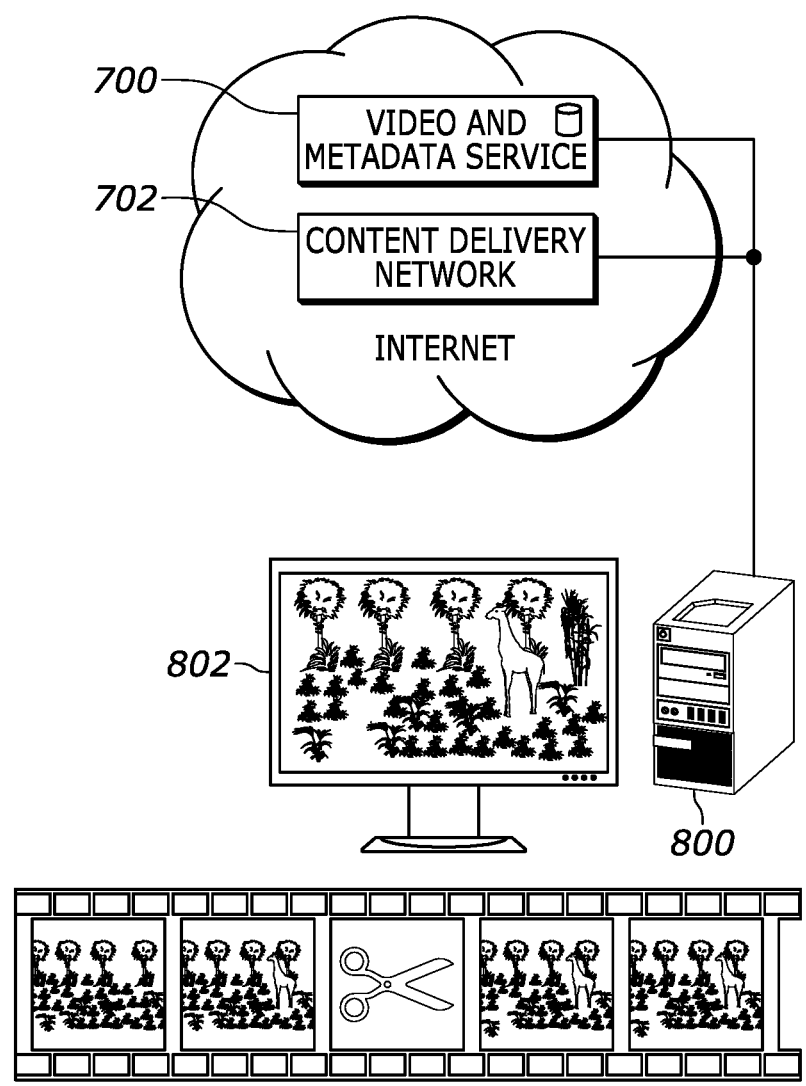

Now referring to FIGS. 7 and 8, once the UGC 504 is correctly identified by a unique ID as set forth above, the unique ID and/or the start and end times of the UGC 504 can be used to look up the associated content type metadata of the UGC 504. The recording computing device 500 may communicate with a video and metadata service 700 and a content delivery network 702 via the Internet as shown, which in turn may communicate with a spectator computing device 800 with display 802 that can be implemented by any of the computing devices described herein. The metadata describing the content of the UGC 504 scene-by-scene thus may be provided by a metadata service 700 separately from the UGC, which can be provided by the content delivery network 702. The recording computing device 500 can post the metadata independently of sharing or streaming the video data. The metadata can be stored remotely on a network service as shown for association with the video data.

Figure 9:
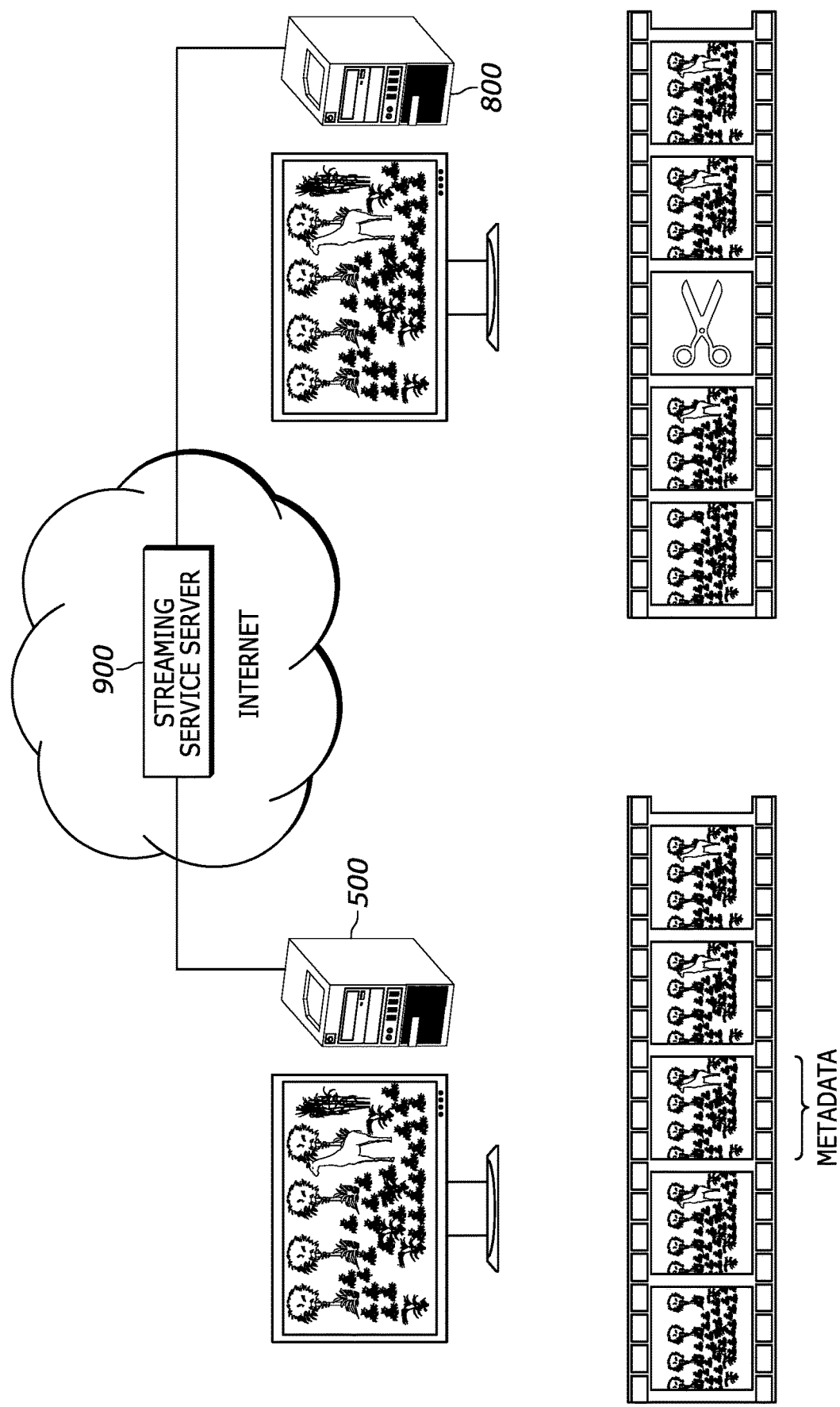

As shown in FIG. 7, the UGC 504 developer can mark each piece of the UGC 504 with a specific piece of metadata indicating the nature of the content (violence, language, sex, etc.) This may be accomplished as video is being captured locally (FIGS. 7 and 8) or streamed to a server 900 (FIG. 9) for provisioning to the spectator computing device 800. The game can also create specific metadata associated with the game play to indicate the type of content being recorded or streamed. The metadata tags describe information related to the type of content either video or stream. This metadata allows the viewer's video player or an intermediary network service to tailor the video data according to the settings and viewing preferences of the viewing player as contained in, e.g., a player profile in the spectator computing device 800. The metadata contains enough information for the editor of the video data to ascertain how it should be modified for the player or group viewing the user generated content. When the UGC 504 is played back on the spectator computing device 800 the metadata associated with the UGC is used to create a custom video that is appropriate to this player's age, rating, country and viewing preferences. UGC data can be removed, edited or replaced based on the player's settings.

In some embodiments, the manipulation of the original UGC may be performed automatically on the server 900, either pre-computed or in real-time. The end result is potentially many different videos from the same video source based on each viewing player's individual settings. Video data can be removed, edited or replaced based on the player's settings and the metadata.

Examples of these types of metadata include the following. In a first option, the unique ID of the UGC 504 is used to query for all metadata associated with the UGC. Using the results of that query, the UGC is edited accordingly. In the example below, the first line indicates the ID of the metadata associated with the UGC and/or the ID of the metadata service 700, the second line is the unique ID of the UGC itself, the third line indicates that for the relevant UGC segment the content type contains gore, and the fourth and fifth lines indicate the start and end times of the segment.

The editing required of the segment is then given. One option, in the example shown, is to excise the entire segment from playback on the spectator device 800 based on the information (filters) in the player profile or other information indicating "everyone". A second option follows for a "modified Rating" of "Fantasy Violence" pointing to a network address at which a substitute clip can be accessed and played in lieu of the original segment. A third option follows for a "modified Rating" of "Mild Violence" giving specific instructions for altering the original segment by blacking out certain content in a specified region of the video frame, muting the first audio track accompanying the video to be edited, and retrieving from a specified network address a replacement audio clip for a second audio track accompanying the video.

```
{
    "metadataId": "meta293d2dabc376378482deff37d12",
    "videoId": "videof8a67551dbe4d8ca96562b47bc36343",
    "type": "Gore",
    "startTime" : "1571337712714",
    "endTime" : "1571337717714",
    "modifications": [
        {
            "modifiedRating": "Everyone",
            "audio": "Cut",
            "video": "Cut"
        },
        {
            "modifiedRating": "Fantasy Violence",
            "startTime" : "1571337712714",
            "URI":
"http://cdn.playstation.net/videof8a67551dbe4d8ca96562b47bc36343/
videoalternative1-fantasy-
violence"
        },
        {
            "modifiedRating": "Mild Violence",
            // Simple example of RGBA color (black), along with box
               to draw over content
            // Audio is muted for a portion of the total section.
            "video": "Obscure {{0,0,0,0.90},{{100,200},{200,200}}}",
            "audioTrack1": "Mute {1571337712714,1571337715714}",
            "audioTrack2":
"http://cdn.playstation.net/videof8a67551dbe4d8ca96562b47bc36343/
audioalternative1"
        }
    ]
}
```

The metadata above thus describes the content of video which has a section or portion which may require some modifications for certain players depending on content filters in the spectating user's profile. The metadata describes the type of content, the absolute time within the UGC and then provides various options for how the video can be modified (cut, mute, obscure sections, etc.). The audio and video can be treated separately where appropriate. If there are multiple audio tracks, those too can be individually specified for modifications as well. Modifications to the UGC may be executed in accordance with parental controls, which may be automatically imported if desired to the child's profile, so that a parent can set a child's content filters in the child's profile.

In another embodiment, an association with each piece of metadata can be made without a unique ID using universal time and another ID such as a player's account Id. For example, for an account ID 39848392847593123 a query may be entered to retrieve all UGC associated with that account for a certain time period. For each UGC that is returned, the start and end time of the UGCs are used to retrieve all of the associated metadata for each period of time (segment) within each UGC from a network service. This service then returns all of the metadata corresponding to the respective time frames thereby allowing the viewing player or streaming service to know how to modify each video accordingly. Example code consistent with this embodiment is:

```
{
  "metadataId": "meta293d2dabc376378482deff37d12",
  "accountId" : "39848392847593123",
  "type": "Gore",
  "startTime" : "1571337712714",
  "endTime" : "1571337717714",
  "modifications": [
    {
      "modifiedRating": "Everyone",
      "audio": "Cut",
      "video": "Cut"
    },
    {
      "modifiedRating": "Mild Violence",
        "startTime" : "1571337712714",
      "URI": "http://cdn.playstation.net/video-
      alternative1-mild-violence"
    },
    // Suggested obscure for Gore to Mild Violence alternative.
    {
      "modifiedRating": "Mild Violence",
      // Simple example of RGBA color (black), along with
      box to draw over content
      //Audio is muted for a portion of the total section.
      "video": "Obscure {{0,0,0,0.90},{{100,200},{200,200}}}",
      "audioTrackl": "Mute {1571337712714,1571337715714}"
    }
  ]
}
```

Figure 10:
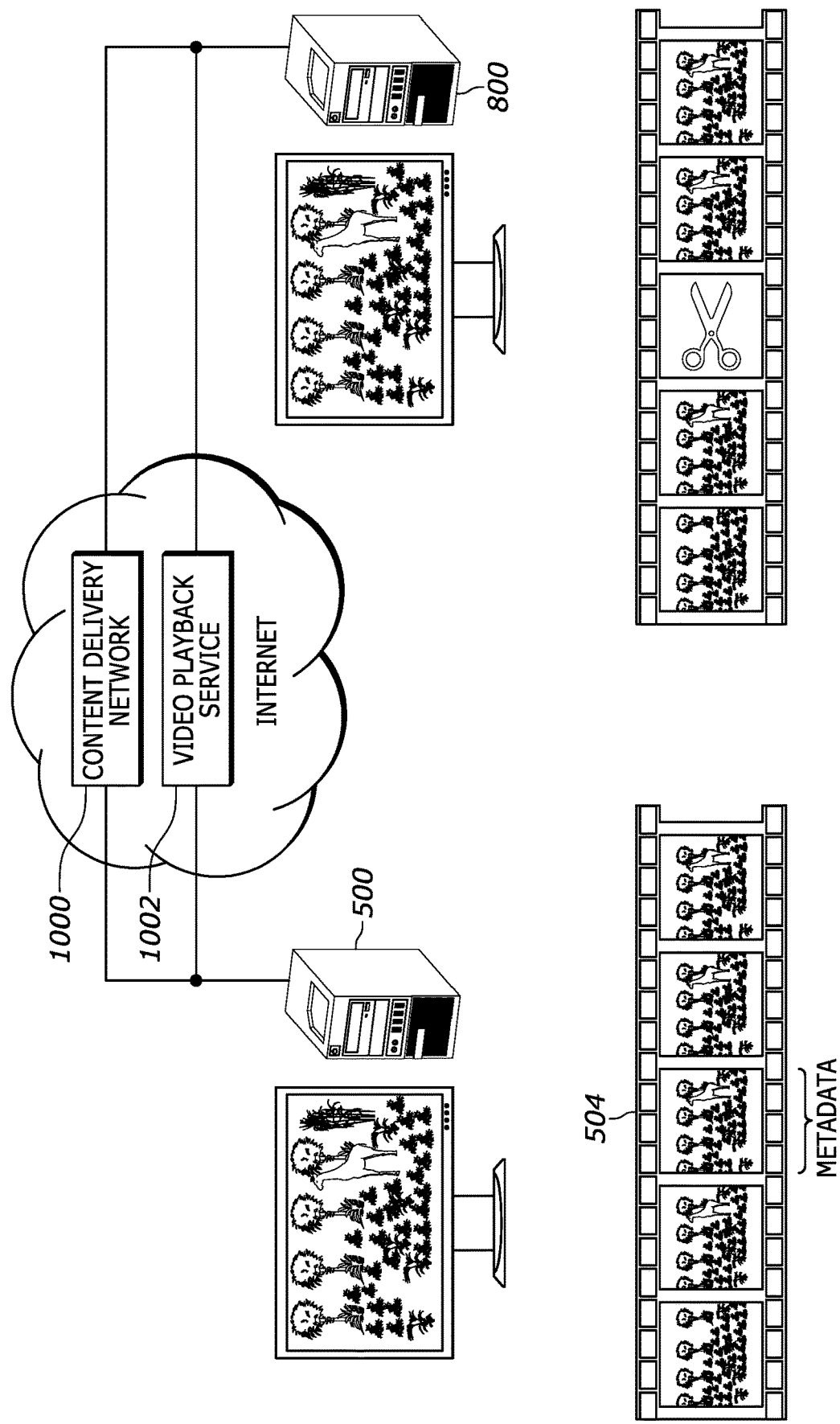
FIG. 10 is a schematic diagram illustrating techniques for embedding metadata into video.

As yet a third optional embodiment, the metadata for a UGC may be embedded in the UGC itself. Refer to FIG. 10. As shown, the recording computing device 500 can communicate with a content delivery network 1000 and a video playback service 1002, as can the spectator computing device 800, which can receive a single source of data (video combined with metadata) and then process in real time the video data without the requirement of having a separate UDS or metadata service. Alternatively, a server can edit the UGC.

Figure 11:
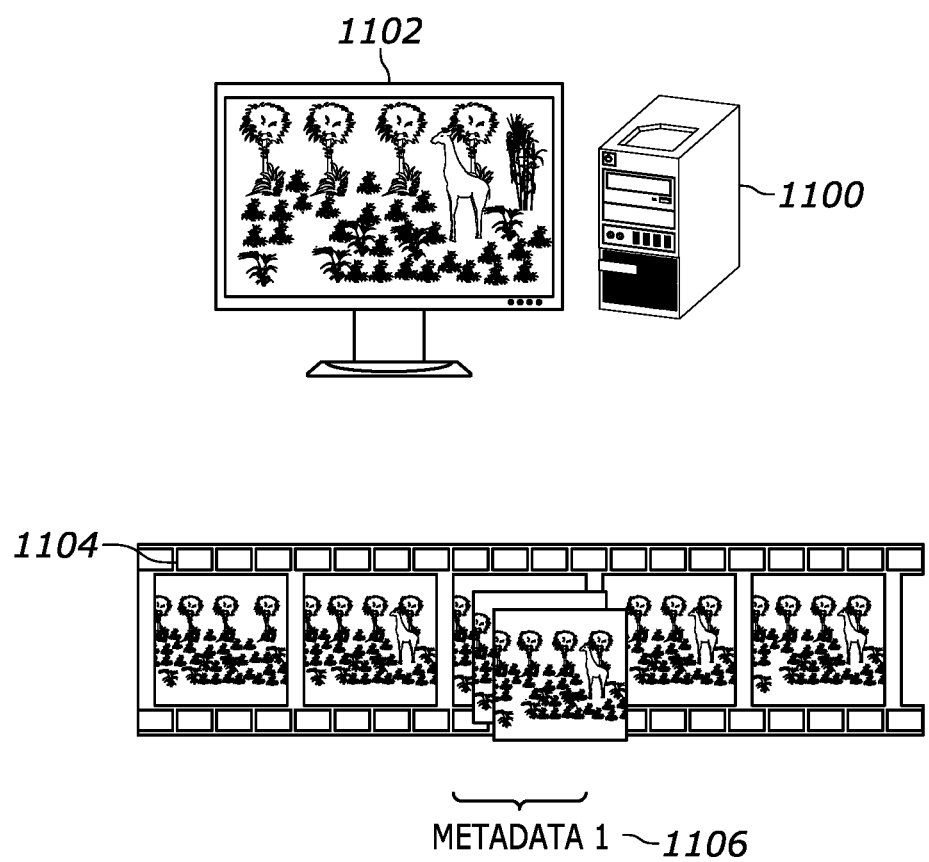
FIGS. 11 and 12 are schematic diagrams illustrating techniques for generating multiple scenes with different content ratings from a single user-generated content (UGC)
Figure 12:
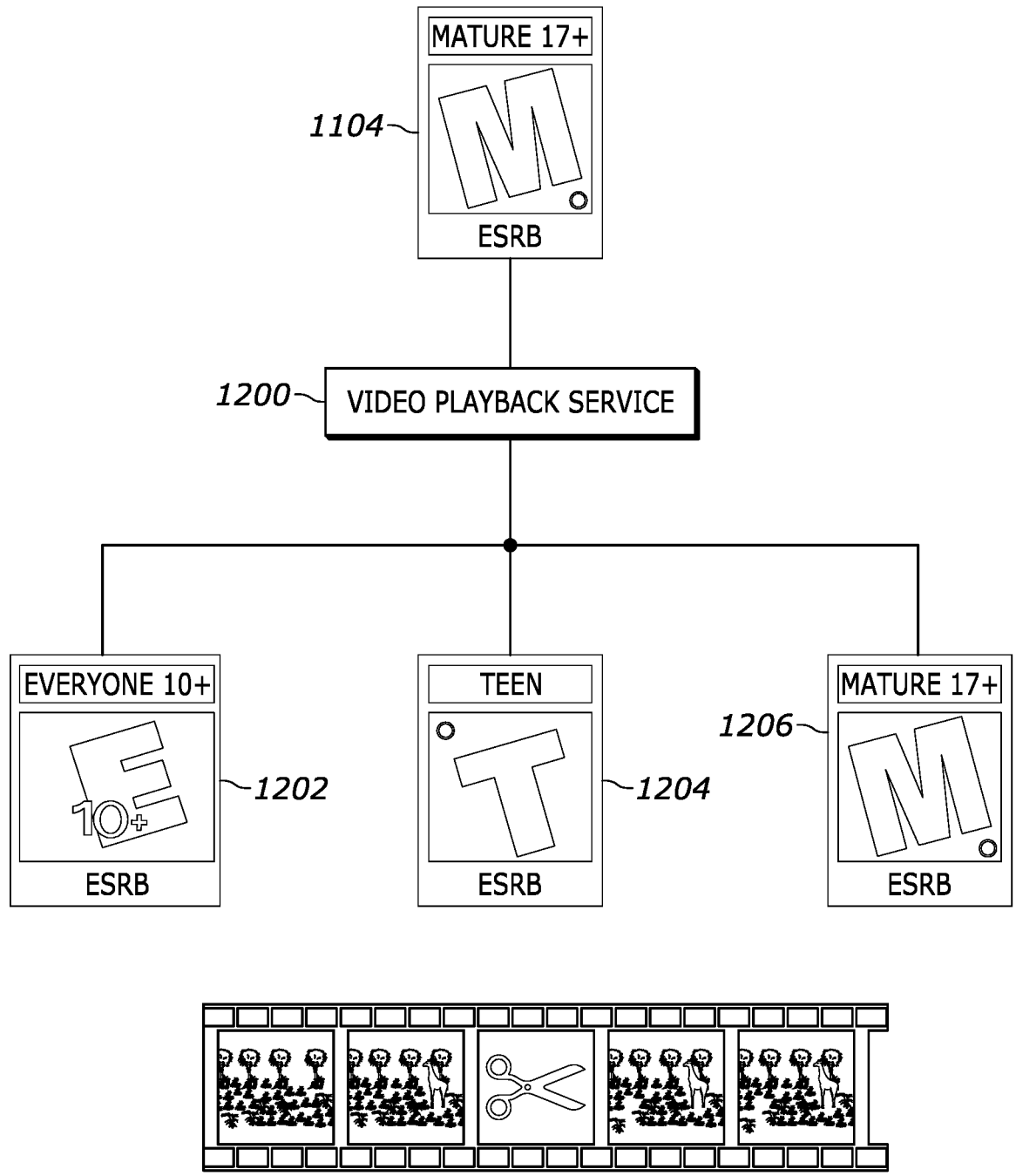

FIGS. 11 and 12 illustrate example techniques for editing UGC according to the metadata associated with the UGC and the content filters in the spectator's profile. Relatively generic viewing streams can be created based on respective different high-level ESRB ratings. A computing device 1100 with display 1102 such as any of the computing devices described herein can edit a UGC clip 1104 using associated metadata 1106. As an example, a UGC segment whose metadata indicates a high-level ESRB "mature" rating can be edited based on the metadata tags down to a "teen" rated video, an "everyone" rated video, etc. This editing can be done on the spectator computing device as shown in FIG. 11 or by a remote server 1200 as shown in FIG. 12, which shows that an original UGC or clip 1104 has been edited into multiple versions including an "everyone" version 1202, a "teen" version 1204, and a "mature" version 1206. Players can then access the content they want to view based on their settings or choice.

Continuing in this vein, for scenes that depict a certain category such as Gore, the game can choose to render multiple version of the same scene based on the various levels of the ratings to allow for different players to view. These multiple scenes may be embedded into the uploaded video itself (including metadata). The rendering client can then choose which view to render to the player based on the filters in the spectator's profile. Or, these sections may be uploaded separately to a server. When the spectator-client requests to playback the UGC, these marked sections may instead come from the alternatively rendered content stored on the server 1200.

Below is example code consistent with the above discussion, with metadata 1 indicating editing to be done by the end user (spectator) computing device and metadata 2 indicating to the spectator computing device a network address at which to access an alternative clip specified by the indicated start and end times:

```
Metadata 1
{
  "id" : "video8a67551dbe4d8ca96562b47bc36343",
  "type" : "Gore",
  "startTime" : "1571337712714",
  "endTime" : "1571337717714",
}
Metadata 2
{
  "id" : "videof8a67551dbe4d8ca96562b47bc36343",
  "fragmentId:"fragmabe12358967abc08127e4d8ca9"
  "type" : "Mild Violence",
  "startTime" : "03:30",
  "endTime" : "03:35",
  "URI" : "http://cdn.playstation.net/videoalternative1-mild-violence"
}
```

Figure 13:
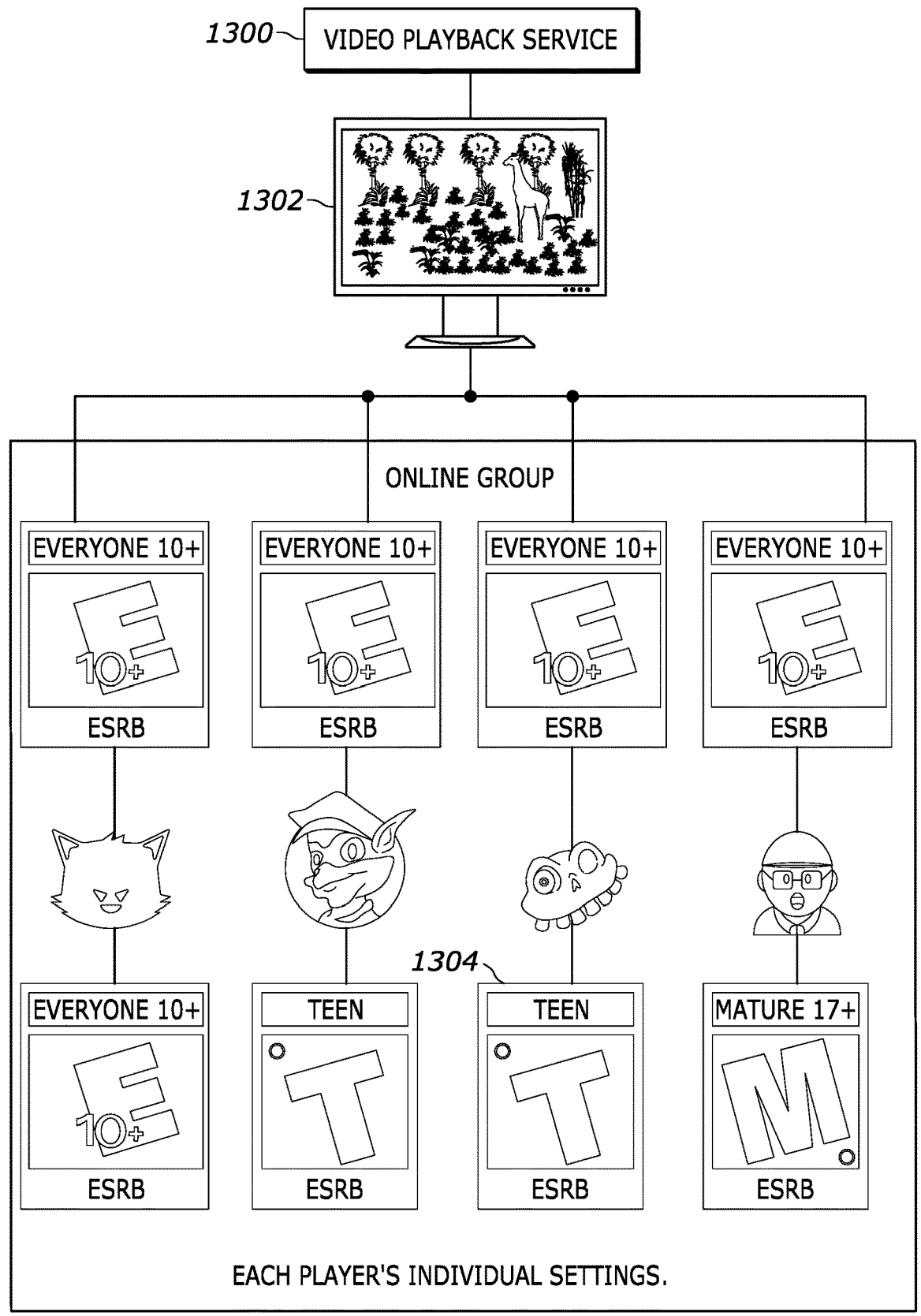
FIGS. 13 and 14 are schematic diagrams illustrating techniques for real time group viewing of UGC.
Figure 14:
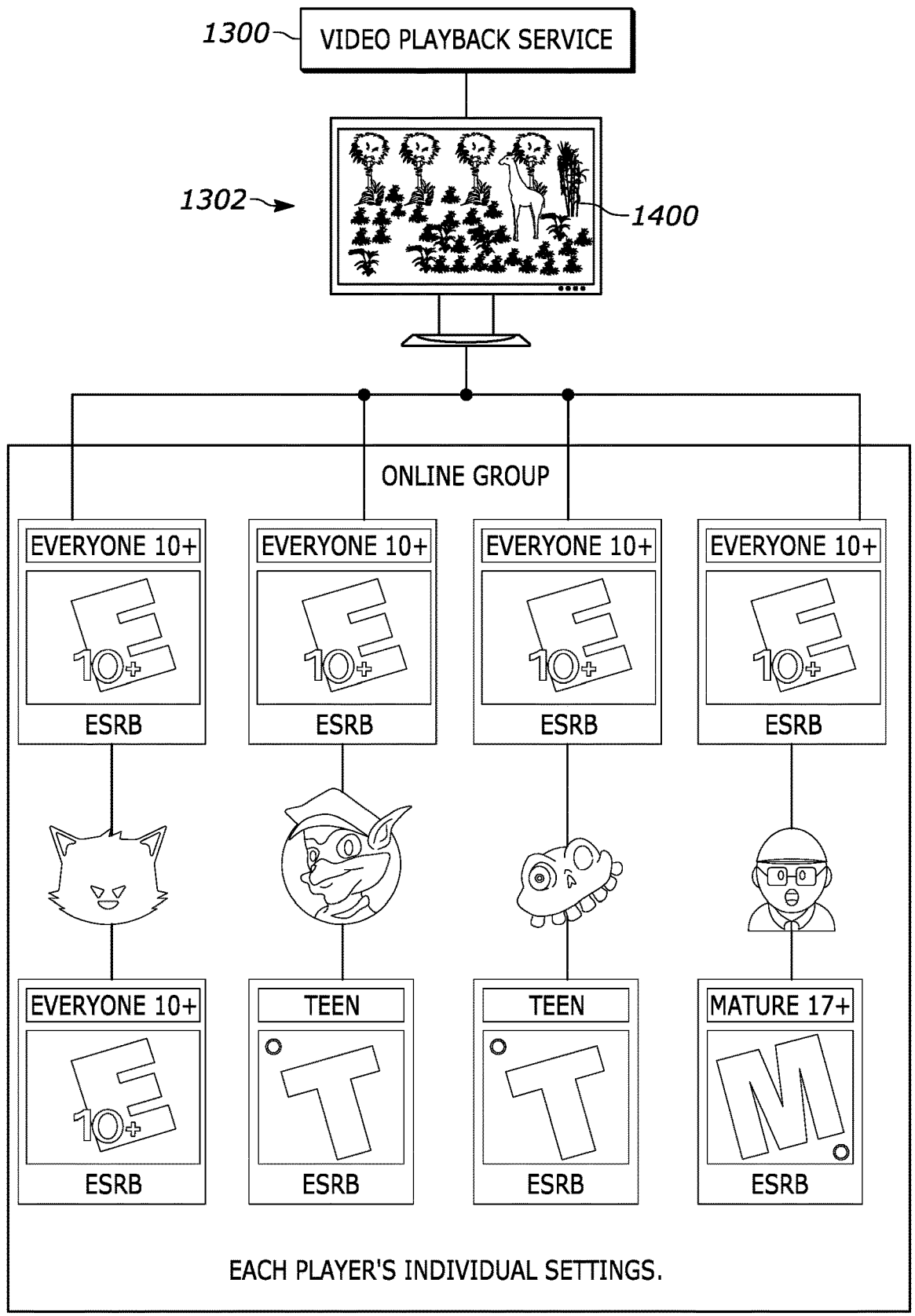

Refer now to FIGS. 13 and 14 for group environments where there are multiple spectators who are viewing the stream together. One or more streams can be created by, e.g., a video playback server 1300 from the UGC 504 using the combined viewing preferences or the lowest common denominator. For example, if there is a group one of whom can only view Everyone rated videos, then an Everyone rated video or stream is selected and played by a spectator device 1302 accessing content filters 1304 from respective plural spectator profiles. Likewise, the combined viewing preferences of everyone identified as spectating (using face recognition or user login or voice recognition or other means) may be used to create a custom viewing stream for those spectators uniquely. A slightly different group of players could result in a completely different viewing stream as shown at 1400 in FIG. 14, in which the spectator device 1302 presents a different version of the UGC from that presented in FIG. 13.

As used herein, the video content of UGC or other content is generically defined as any piece of video format either file-based (mp4, ogg, wmv, webm, avi etc.) or streaming-based content (H.264, rtmp, hds, hls, etc.).

For Live Stream Views, as the streamer is uploading the content to the server the metadata tags can also be sent along with the stream. These tags are available for interpretation on the server backend. The server backend can then modify the stream based on a player watching that stream. Similarly, those metadata tags can be forwarded onto the client and the client can perform the interpretation as well.

Figure 15:
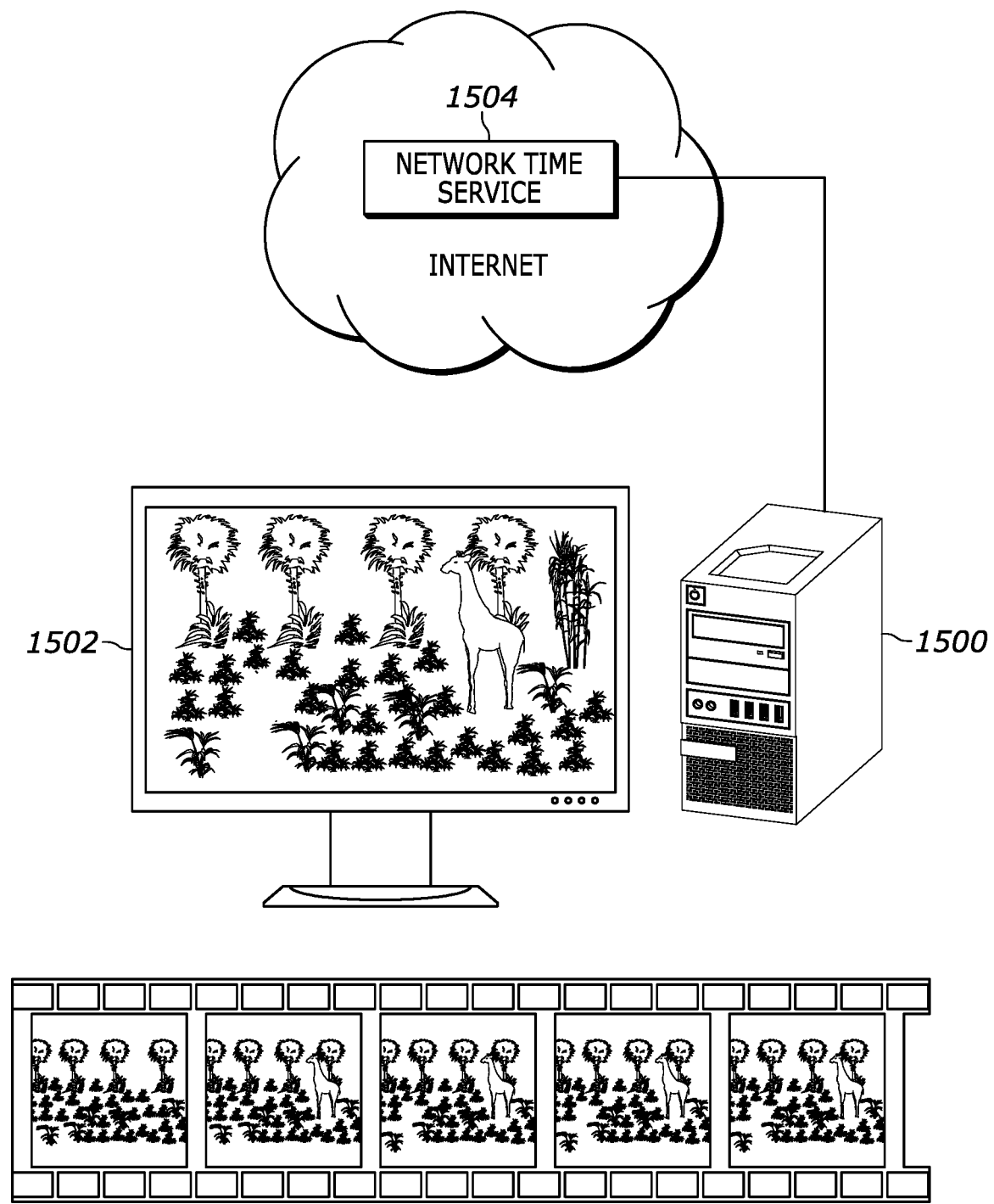
FIGS. 15 and 16 are schematic diagrams illustrating additional techniques.
Figure 16:
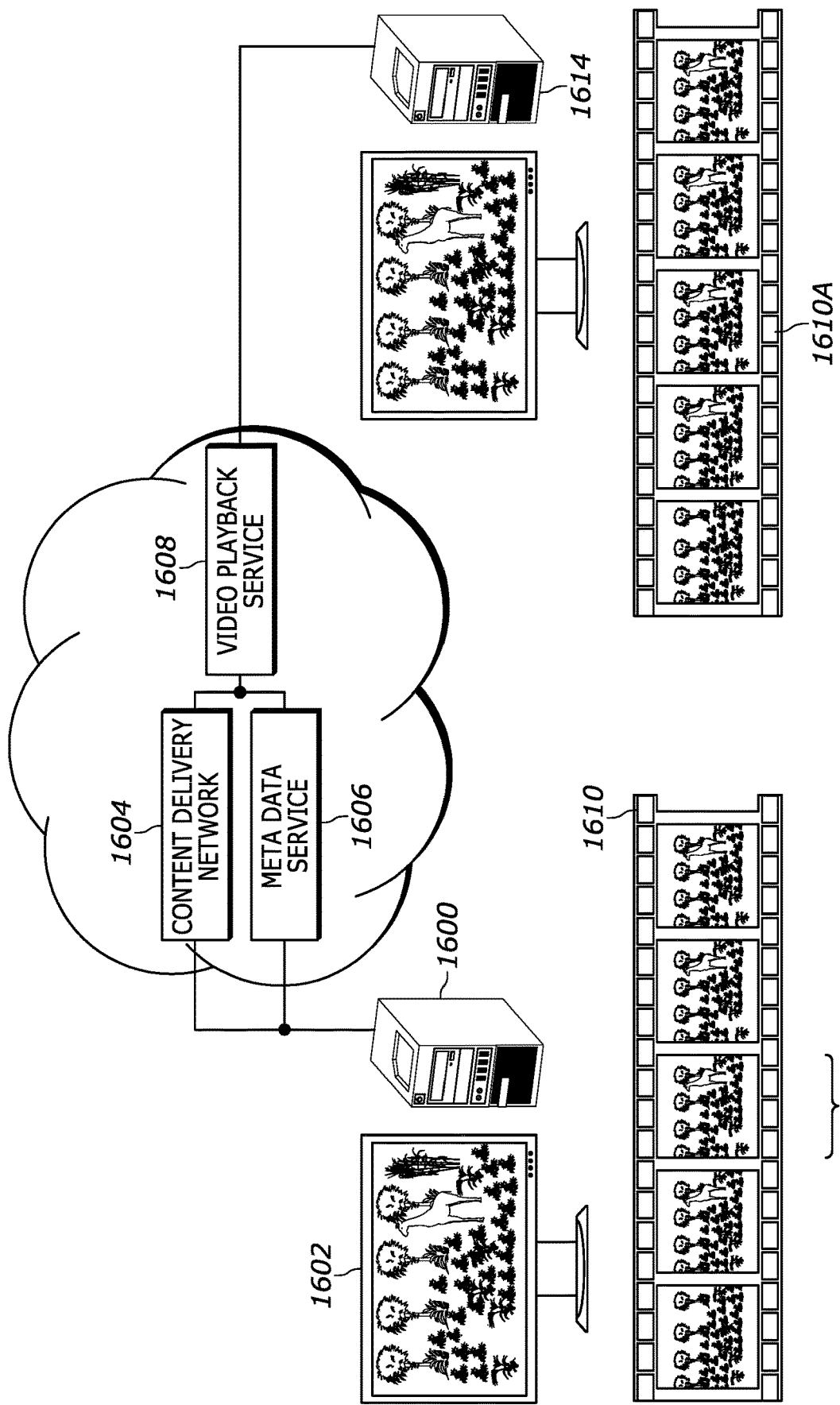

FIGS. 15 and 16 illustrate additional principles. In FIG. 15 a computing device 1500 with display 1502 such as any of the computing devices described herein can access, via a network such as the Internet, absolute network time from a network time server 1504. Using absolute network time, a start time and end time point for a video or segment thereof can be captured. The absolute network time can also be used to tag the metadata so that the UGC is synchronized with the metadata. As the player is only capturing a single game at a time, this time data may be used to request the corresponding ratings metadata for editing of the video (UGC). To this end the computing device 1500 may employ a high precision computer clock.

In FIG. 16 a computing device 1600 with display 1602 such as any of the computing devices described herein can access, via a network such as the Internet, a content delivery network 1604, a metadata service 1606, and a video playback service 1608, which can provide UGC 1610 as edited according to metadata 1612 to a spectator device 1614. Example metadata may be:

```
{
"id" : "videf8a67551dbe4d8ca96562b47bc36343",
"type" : "Gore",
"startTime" : "1571337712714",
"endTime" : "1571337717714",
"audioEdit" : {Mute or Garble or Replacement audio URI},
"videoEdit" : {Obscure: Color, Transparency, Coordinates {X,Y}}
}
```

The metadata above indicates that for a given segment with the specified start and end times, gore is depicted, along with a network address at which a replacement clip can be accessed.

In FIG. 16, the manipulation can be performed automatically on the video playback server 1608 either pre-computed or in real-time. The end result video 1610A is potentially many different videos from the same original UGC 1610 based on each viewing player's individual settings. Video data can be removed, edited or replaced by the server based on the player's settings and the metadata.

It will be appreciated that whilst present principals have been described with reference to some example embodiments, these are not intended to be limiting, and that various alternative arrangements may be used to implement the subject matter claimed herein.

What is claimed is:

1. An assembly comprising:
at least one source computing device configured with executable instructions to generate, from at least one computer game, user-generated content (UGC), the UGC being associated with metadata comprising at least one content type indicator;
at least one spectator computing device configured with executable instructions to access the UGC using a unique identifier (ID) associated therewith and to access the metadata using the unique ID; and
at least one editing device configured with executable instructions to modify the UGC for presentation on the spectator computing device according to the metadata, the metadata associated with the UGC that is accessed using the unique ID indicating plural options for how the UGC can be modified.

2. The assembly of claim 1, wherein the editing device comprises the spectator computing device.

3. The assembly of claim 1, wherein the editing device comprises at least one network server.

4. The assembly of claim 1, wherein the unique ID comprises a pseudo-random number.

5. The assembly of claim 1, wherein the unique ID comprises a combination of a device ID, and at least one time.

6. The assembly of claim 1, wherein the editing device is configured with executable instructions to conceal at least a portion of the UGC according to the metadata and the content filter.

7. The assembly of claim 1, wherein the editing device is configured with executable instructions to replace at least a portion of the UGC with data from a computer network according to the metadata and the content filter.

8. The assembly of claim 1, wherein the editing device is configured with executable instructions to mute audio associated with the UGC according to the metadata and the content filter.

9. The assembly of claim 1, wherein the editing device is configured with executable instructions to replace audio associated with the UGC according to the metadata and the content filter.

10. The assembly of claim 1, wherein the metadata is stored on at least one server separately from the UGC.

11. The assembly of claim 1, wherein the metadata embedded in the UGC.

12. The assembly of claim 1, wherein the metadata indicates a specific content type.

13. The assembly of claim 1, wherein the metadata indicates a generic rating.

14. A system comprising: a developer computer receiving input of content tags signifying type of content at various points in a video; and a viewer device requesting the video and associated with a video generator to generate a version of the video altered as appropriate according to one or more content filters associated with the viewer device and the content tags, the content tags indicating a section or portion of the video which requires modifications for certain players depending on content filters in at least one user profile, plural options being provided to the viewer device for how the video can be modified.

15. The system of claim 14, wherein at least one content tag indicates sexual content.

16. The system of claim 14, wherein at least one content tag indicates violence.

17. The system of claim 14, wherein at least one content tag indicates political content.

18. An apparatus comprising:
at least one processor configured with instructions to:
establish user generated content (UGC);
associate the UGC with a unique identifier (ID);
associate a first segment of the UGC with first metadata indicating a first type of content in the first segment and associate a second segment of the UGC with second metadata indicating a second type of content in the second segment; and
upload the UGC with metadata to a network server for provisioning the UGC to at least one spectator computer, wherein the first metadata indicates content of video which has a section or portion which requires modifications for certain players depending on content filters in at least one user profile, the metadata further indicating absolute time within the UGC and plural options for how the video can be modified.

19. The apparatus of claim 18, wherein the unique ID comprises a pseudorandom number.

20. The apparatus of claim 18, wherein the unique ID comprises a combination of a timestamp, a user ID, and a device ID.

* * * * *